(12) United States Patent
Hageman et al.

(10) Patent No.: US 7,685,173 B2
(45) Date of Patent: Mar. 23, 2010

(54) SECURITY AND AUTHORIZATION DEVELOPMENT TOOLS

(75) Inventors: Mary I. Hageman, Raleigh, NC (US); Elmer M. Johnson, Jr., Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 2199 days.

(21) Appl. No.: 10/015,256

(22) Filed: Dec. 13, 2001

(65) Prior Publication Data

US 2003/0112666 A1    Jun. 19, 2003

(51) Int. Cl.
*G06F 12/00* (2006.01)
(52) U.S. Cl. ............................ 707/203; 707/9; 707/100; 707/102
(58) Field of Classification Search ............... 705/1, 705/8, 51; 707/8–10, 102, 200, 203, 100; 709/201, 220, 223; 717/174, 177–178
See application file for complete search history.

(56) References Cited

U.S. PATENT DOCUMENTS 6,341,287 B1 * 1/2002 Sziklai et al. ............... 707/102
6,578,199 B1 * 6/2003 Tsou et al. .................. 717/178
6,697,806 B1 * 2/2004 Cook .......................... 707/10

* cited by examiner

*Primary Examiner*—Charles Rones
*Assistant Examiner*—Mellissa M Chojnacki
(74) *Attorney, Agent, or Firm*—Gibb I.P. Law Firm, LLC

(57) ABSTRACT

A computer system executing a method for tracking custom computer application development profiles in a data processing system comprising a first, second and third database tool connected to each other; a data bank connected to each database tool; and a security and authorization interface connected to the data processing system. The first database tool, or security and authorization profile change request database, comprises a first set of protocols which create and edit the profiles, and allows requestors an ability to view the documented progress of queries of the profiles. The second database tool, or profile requirement worksheet, comprises a second set of protocols which gather requirements of the profiles and identify the data. The third database tool, or Profile Matrix, comprises a third set of protocols which track modifications of the profiles and allows tracking capability of the tasks required to gather and implement changes to the profiles.

21 Claims, 3 Drawing Sheets

SECURITY AND AUTHORIZATION DEVELOPMENT TOOLS

BACKGROUND OF THE INVENTION

1. Field of the Invention

The present invention generally relates to information systems and, more particularly, to database management systems for security and authorization development tools.

2. Description of the Related Art

Conventional database management systems utilizing a relational (related) database for storing and accessing information relevant to a particular application are well-known in the art. These relational databases are typically designed such that information can be stored in one particular file that relates to information stored in another file within the same database system. A database system may be comprised of files accessible over communication networks as well as locally. Information stored in related files allow for the quick retrieval of more complex information than would otherwise be possible, such as information continuously updated in a database system. Information stored in such a database provides a convenient method for authorized users to retrieve information by typing in a query with knowledge of the underlying format.

Moreover, conventional database systems maintain their data in a durable storage mechanism such as a disk drive. Usually, the database system will also have a non-durable copy of an active portion of the database in a volatile memory cache wherein the data in the volatile memory cache can be rapidly accessed, but can also be destroyed and lost in the event of a system crash, program failure, power surge or similar abnormal termination. In order to maintain the integrity of the database, updates to the database system must be guaranteed to be stored, i.e., committed, in the durable storage mechanism.

One application for database systems is workflow systems. Workflow systems effect business processes by controlling the scheduling and parameters of activities, acquiring their results, and using the results in determining other activities to be run. A business process is a description of the sequencing, timing, dependency, data, physical agent allocation, business rule, and organization policy enforcement requirements of business activities needed to enact work. Most workflow systems utilize relational, object-oriented, network or hierarchical database management systems to store data relating to the business process.

In general, workflow systems perform a wide range of tasks. For example, they can provide a method for defining and managing the flow of a work process or support the definition of resources and their attributes. Additionally, workflow systems can assign resources to work, determine which steps will be next executed within a work process, when they will be executed, and can ensure that the workflow process continues until proper termination. Furthermore, workflow systems can notify resources about pending work and enforce administrative policies such as tracking execution and support user inquiries of status.

Oftentimes it is useful for some workflow process applications to have access to historical data regarding data changes within the system. Historical data takes the form of an audit trail for completed workflow processes and is useful to the collection of statistical data for process and resource bottleneck analysis, flow optimization and automatic workload balancing.

Since data in a workflow system represents work that needs to be done or has already been done, the database generally needs to provide a high degree of reliability. Loss of the data related to a completed work event can mean the loss of the work performed by the work event. It is also quite useful for some applications to provide convenient access to historical data from the system.

In modern data processing environments, a client's data is often distributed among a plurality of heterogeneous database systems. Heterogeneous database systems are database systems that have different data definition and manipulation procedures, security procedures, system management approaches, capabilities, etc. Examples of heterogeneous database systems include DB2®, available from IBM, Armonk, N.Y., USA; Oracle®, available from Oracle Corp., Redwood Shores, Calif., USA: and Sybase®, available from Sybase Inc., Emeryville, Calif., USA, etc. Such heterogeneous database systems, when used together, collectively represent a heterogeneous, distributed database environment (or system). Heterogeneous, distributed database systems are also sometimes called federated database systems and/or multi-database systems.

In order to enhance user-friendliness, it is preferred that clients be provided with a common interface to all of the heterogeneous database systems. In other words, it is preferred that clients be under the illusion that they are interacting within a single database system.

However, one of the inherent weaknesses of the conventional database systems is the inability to provide updated tracking and status guidelines and progression of ongoing projects as they occur in a multi-level corporate environment, and in the security and authorization environment, in particular. Moreover, there remains a need for a new and improved database system to track software and hardware fulfillment development and software and hardware fulfillment production, and to communicate any modifications of these operations to user profiles as they pertain to new functional releases of software programs. Furthermore, there is a need to consolidate the data used in the development of software programs in order to provide for a more efficient auditing procedure, and to ensure that access to software development-related data remains secure, and access to such data is limited to those on a need-to-know basis.

SUMMARY OF THE INVENTION

In view of the foregoing and other problems, disadvantages, and drawbacks of the conventional database systems, the present invention has been devised, and it is an object of the present invention, to provide a structure and method for a new and improved database management system for security and authorization development tools.

In order to attain the object suggested above, there is provided, according to one aspect of the invention, a computer system executing a method for tracking custom computer application development profiles in a data processing system, wherein the computer system comprises a first database tool, a second database tool connected to the first database tool, a third database tool connected to the first and second database tools, a data bank connected to the first, second and third database tools, and a security and authorization interface connected to the data processing system.

The first database tool comprises a first set of protocols which create and edit the profiles. The second database tool comprises a second set of protocols which gather requirements of the profiles. The third database tool comprises a third set of protocols which track modifications of the profiles.

Moreover, the first database tool comprises a security and authorization profile change request database which allows the authorization users and requesters the ability to view documented progress of their queries pertaining to the profiles. Furthermore, the second database tool comprises a profile requirement worksheet which identifies the data. Additionally, the second database tool further identifies authorization objects and field values of the profile requirement worksheet necessary to gather the requirements of the profiles.

Finally, the third database tool comprises a Profile Matrix which comprises a data set. Also, the third database tool allows tracking capability of tasks required to gather and implement changes to the profiles.

There are several benefits of the present invention. First, prior to the present invention, no system provides a method and system for tracking updates to changes in profiles of specifications required for software coding and development. Moreover, no other system or method provides a history of the updates and changes in a clear and concise manner, as does the present invention. Furthermore, the present invention significantly reduces cycle times and administrative costs in the auditing procedures synonymous with software development. Additionally, the present invention provides for a fully-documented database which aids in the internal auditing and control process. Finally, the present invention provides the ability to ensure that software development for a particular program or release is secure in terms of providing access to the development information (such as specifications, requirements, customized solutions, coding, programmers' comments, etc.) to only those individuals and entities absolutely required to have such information.

BRIEF DESCRIPTION OF THE DRAWINGS

The foregoing and other objects, aspects and advantages will be better understood from the following detailed description of preferred embodiments of the invention with reference to the drawings, in which.

Figure 2:
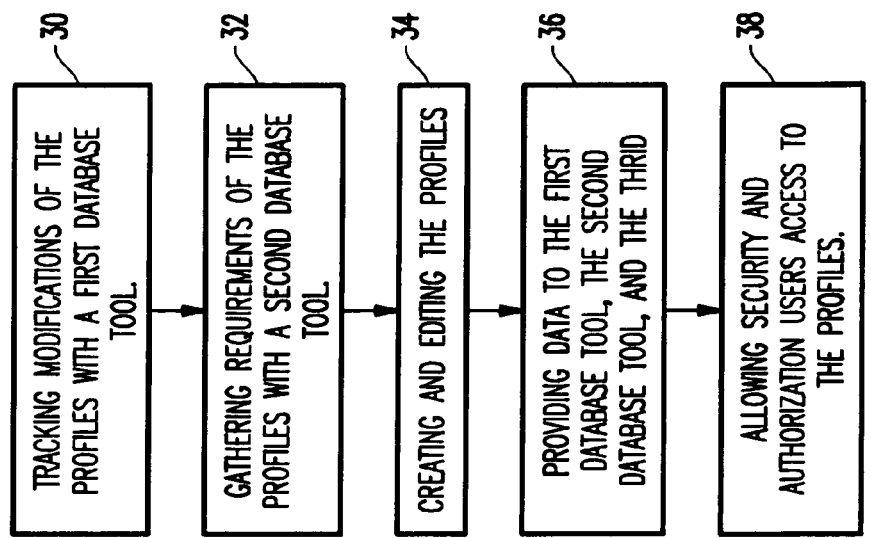
FIG. 2 is a flow diagram illustrating a preferred method of the present invention.

DETAILED DESCRIPTION OF PREFERRED
EMBODIMENTS OF THE INVENTION

As previously mentioned, there is a need for a new and improved database system to track software and hardware fulfillment and development progress, to track software and hardware fulfillment production, and to communicate any modifications of these operations to user profiles as they pertain to new functional releases of software programs or other ongoing projects.

The present invention and its tools solve problems related to tracking the status and progression of software program release-related development profiles. The various types of programs which the present invention and its tools can work with include virtually any type of computer software program, including custom applications and their development from release-to-release (i.e., the first version of a particular software to the nth version of the software). The types of profiles which the present invention relates to includes end-user profiles such as tracking updates and problems, error consolidation and correction, and a status of the requests for updates.

Referring now to the drawings, and more particularly to FIGS. 1 through 5, there are shown preferred embodiments of the method and structures according to the present invention. Specifically, in FIG. 1, a schematic diagram of the database system 20 is shown comprising a Profile Matrix 24, a Profile Requirement Worksheet tool 26, and a Security and Authorization Profile Change Request Database 28, all communicating together and collectively, and extracting data from a Profile Data Bank 22. A Security and Authorization Team interface 25 is further provided to allow access to the database system 20. This database design is different than conventional databases because the present invention provides a Security and Authorization Team interface 25.

FIG. 2 illustrates a preferred flow diagram illustrating a preferred method according to the present invention. The method for tracking custom computer application development profiles in a data processing system 20 comprises a step 30 of tracking modifications of the profiles with a first database tool 24. The method further comprises a step 32 of gathering requirements of the profiles with a second database tool 26 and a step 34 of creating and editing the profiles with a third database tool 28. Moreover, the method comprises a step 36 of providing data to the first database tool 24, the second database tool 26, and the third database tool 28; and a step 38 of allowing security and authorization users access to the profiles. This methodology is different than conventional methodologies and data processing systems because the present invention provides a Security and Authorization Team interface 25 and allows security and authorization users to have access to the profiles.

In the step 30 of tracking modifications of the profiles with a first database tool 24, the first database tool 24 comprises a Profile Matrix 24 wherein the Profile Matrix 24 comprises a data set. Moreover, in the step 30 of tracking modifications of the profiles with a first database tool 24, the first database tool 24 allows for tracking capability of tasks required to gather and implement changes to the profiles.

In the step 32 of gathering requirements of the profiles with a second database tool 26, the second database tool 26 comprises a profile requirement worksheet 26 which identifies the data. Additionally, in the step 32 of gathering requirements of the profiles with a second database tool 26, the second database tool 26 further identifies authorization objects and field values of the profile requirement worksheet 26 necessary to gather the requirements of the profiles.

In the step 34 of creating and editing the profiles with a third database tool 28, the third database tool 28 comprises a security and authorization profile change request database 28, which allows the authorization users and requesters the ability to view documented progress of queries of the profiles.

Figure 1:
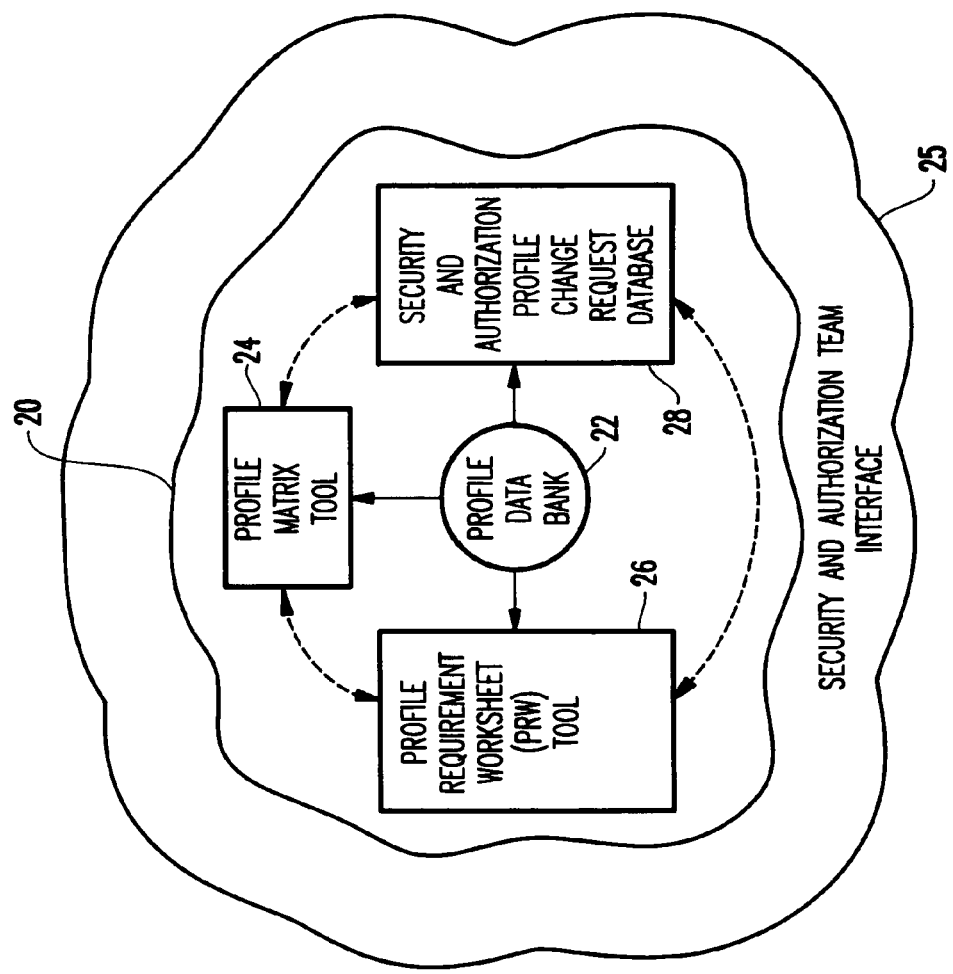
FIG. 1 is a system diagram illustrating a preferred embodiment of the present invention.
Figure 3:
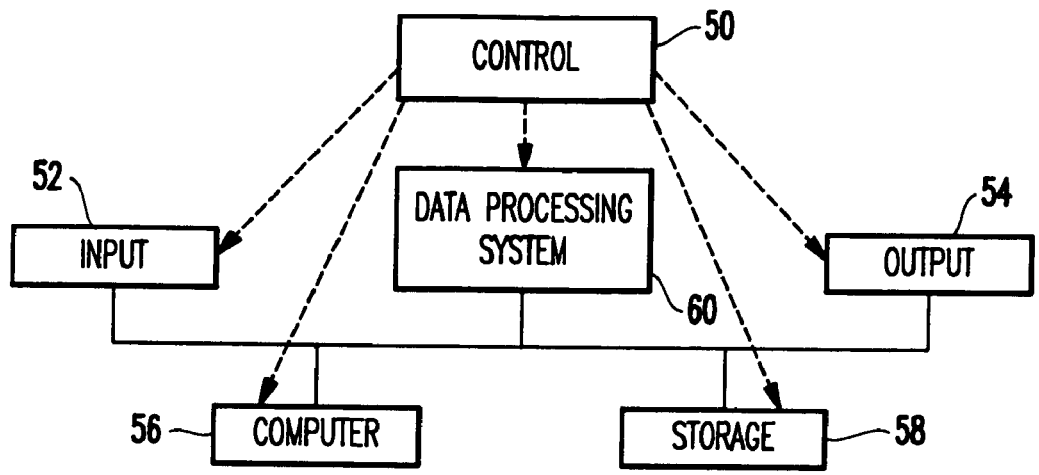
FIG. 3 is a database system diagram according to an embodiment of the present invention.

In FIG. 3, a general schematic diagram of the database system is shown according to the present invention wherein a control unit 50 provides instructions to an input interface 52, an output interface 54, the computer central processing unit 56, the storage and memory units 58, and the data processing system 60. Again, the present database system is different than conventional database systems because the present invention provides a data processing system 60 which communicates with a Security and Authorization Team interface 25 (as seen in FIG. 1).

Figure 4:
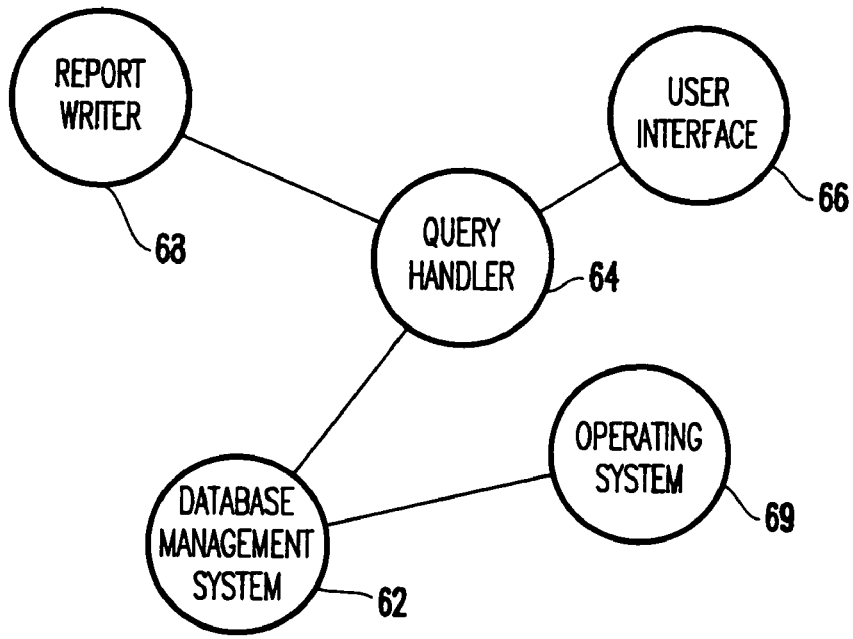
FIG. 4 is a graphical illustration of the interrelation of the software of the present invention.

In FIG. 4, a graphical illustration of the interrelation of the software of the present invention is shown. Here, the operating system 69 interacts with the database management system 62 which provides selected data based on instructions provided by the query handler 64. A user interface 66 allows a user to input a desired query into the query handler 64 which, upon receiving data from the database management system 62, outputs the results to a report writer 68. Again, the present database management system 62 is different than conventional database management systems because of the presence of a Security and Authorization Team interface 25 (as seen in FIG. 1).

Figure 5:
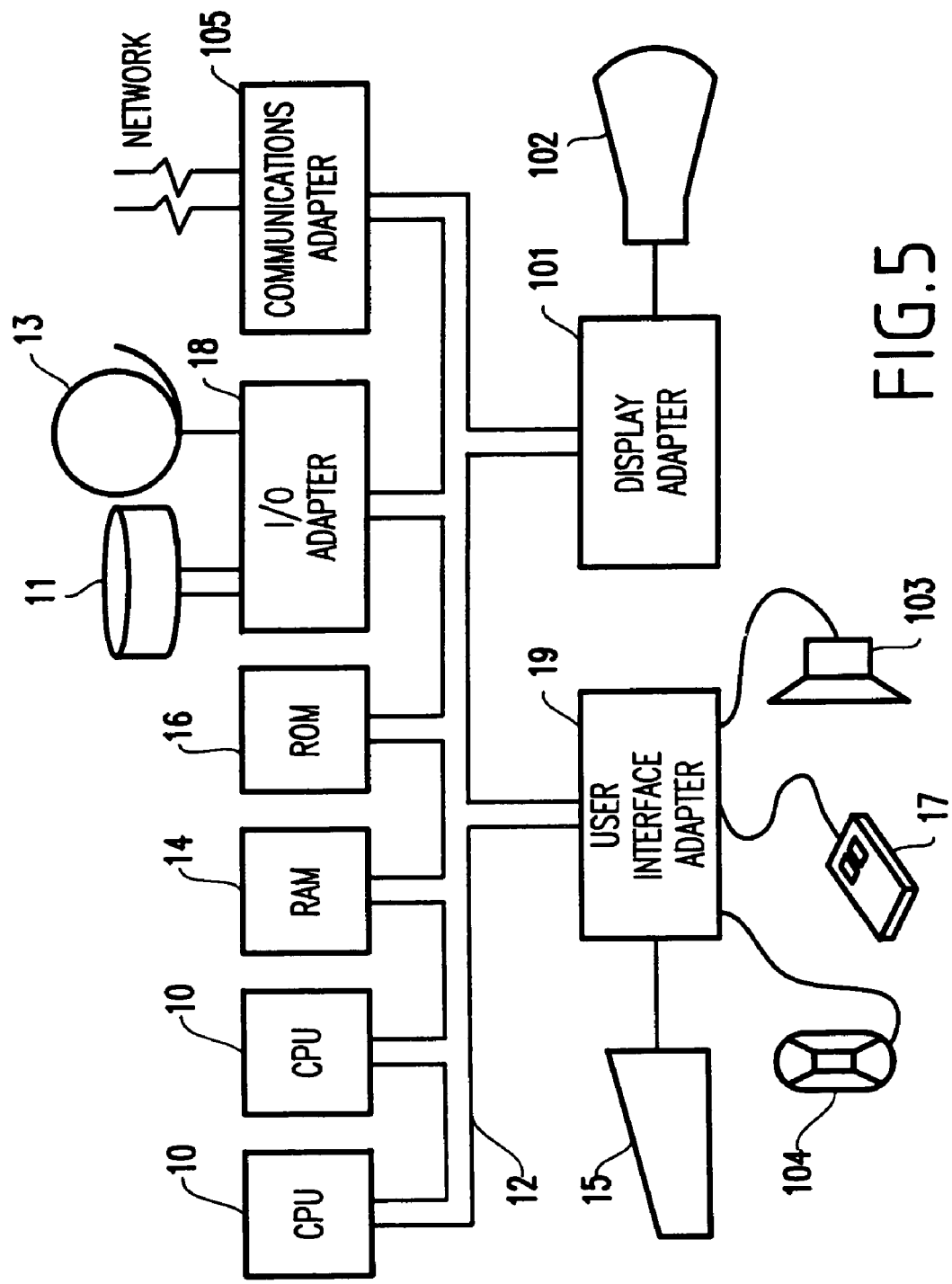
FIG. 5 is a system diagram illustrating a preferred embodiment of the present invention.

In FIG. 5, there is shown a system diagram according to the present invention, wherein a representative hardware environment for practicing the present invention is depicted as the diagram illustrates a typical hardware configuration of an information handling/computer system, in accordance with the subject invention, having at least one processor or central processing unit (CPU) 10. The CPUs 10 are interconnected via system bus 12 to random access memory (RAM) 14, read-only memory (ROM) 16, an input/output (I/O) adapter 18 for connecting peripheral devices such as disk units 11 and tape drives 13, to bus 12, user interface adapter 19 for connecting keyboard 15, mouse 17, speaker 103, microphone 104, and/or other user interface devices such as a touch screen device (not shown) to bus 12, communication adapter 105 for connecting the information handling system to a data processing network, and display adapter 101 for connecting bus 12 to display device 102. A program storage device readable by the disk or tape unit is used to load the instructions which operates on a wiring interconnect design which is also loaded onto the computer system.

The present invention provides for an easily accessible Profile Summary Matrix tool 24 to allow for the ability to not only track the profile progress of projects currently in development, but also for use in the production environment for company-specific internal control audits and certification reviews. Specifically, internal auditors use the Profile Summary Matrix tool 24 to review the status of the development of a particular release of software (i.e., first version to nth version of the software). Often, the review occurs after the software has been completed. The auditors verify whether the product specifications have been met, as well as verify that all other requirements of the software have been met. The auditors review the profiles generated throughout the development of the software and compare the final product (software) with the actual profile, which may include the specifications, in order to review the history of the development. This will show the auditor where updates or changes were made during the course of the development of the software. Furthermore, the auditors review the history to determine if there have been any breaches in security; that is, whether those individuals, such as end-users, are duly authorized to receive the software, coding, etc.

Furthermore, the present invention provides for Profile Requirement Worksheets (and tool) (PRWs) 26 to identify the historical transaction, report and custom table development in relation to each of the release requirements. This is important because it provides another manner in which to review the history of the development of the software. Additionally, the PRWs identify specific business requirements (specifications) which the software must provide.

Moreover, the present invention provides for a Security and Authorization (S&A) Profile Change Request Database 28 to allow users the ability to request modifications to current profiles and to track the progress of their requests. This is different than conventional relational databases or conventional workflow systems because the present S&A Profile Change Request Database 28 specifically determines whether breaches in security have occurred in all phases of the development of a software program. Also, the present database ensures that only those individuals or entities which have been identified by company-specific internal controls, who should have access to the software, will have access to the software.

In a preferred embodiment, the Profile Matrix 24 is a tool used to track new release modifications at a high level to the custom application profiles. The Profile Matrix 24 contains the profile description (user name), the profile name, development process team S&A representatives, the date the profile requirement worksheets (PRWs) 26 are delivered to the process team S&A representatives, the date the completed PRW 26 is returned to the development S&A team, and a comment indicating whether there are changes to existing profiles or whether a new profile is required. The Profile Matrix 24 compiles the data entered into the matrix using internal database compilers, such as those known in the art, or the data may be compiled by manual data entry. The data is compiled on an ongoing basis and varies depending on the needs of the developers or end-users. Specifically, the data may be compiled only once during the development of the software or continuously to reflect any updates or changes which occur during the developmental phase of the software.

Furthermore, the Profile Matrix 24 comprises other data such as the date that the development S&A team has updated their documents, the date the development S&A team forwarded the PRWs 26 to the deployment S&A representative and, finally, a column for high-level statements of the alterations. The S&A representatives and team are responsible for ensuring that breaches in security do not or have not occurred and, if they have occurred, what contingencies are necessary to overt further problems. Furthermore, the S&A representatives and team are responsible for identifying those individuals and entities who are allowed to have access to the software, coding, specifications, etc.

The Profile Matrix tool 24 further allows for the tracking capability of the tasks required to gather and implement changes to the profiles. The Profile Matrix 24 identifies each profile. Furthermore, the Profile Matrix 24 identifies how each profile relates to a specific business unit; i.e., financing, billing, operations, distribution, etc. The profiles, however, categorize processes and provide full detail of all of the authorization required for an end user to carry out a particular task or transaction. For example, the profiles may identify a billing process or procedure which a particular software program may implement.

The profiles identify this process in as much as or as little detail as is required by the program specifications and requirements. Additionally, the profiles may change depending upon changes in the program specifications and requirements. The Profile Matrix 24 continuously tracks the changes to the profiles and maintains these changes on a release to release basis. For example, once a change to a profile occurs in the first version of a particular software program, the Profile Matrix 24 maintains the change for all subsequent versions (up to the nth version); i.e., release-to-release.

As mentioned, the present invention provides for a Profile Requirement Worksheet (PRW) 26. The PRW 26 is a tool used by S&A teams to gather requirements regarding release requirements to profiles. It allows the S&A development team to identify the release name, the development process team S&A representative, the profile name and a description of the role of the end user. This is important because it compiles the data for the auditors in an easy to understand and unified form, thereby reducing administrative costs and cycle times.

The development process team S&A representative is responsible for filling out the first section of the form, indicating any additional transactions to the profiles and their associated scripts, hierarchical changes (information-specific to the geography using the profile), report changes, custom-designed tables released and a general comments section.

The second section of the form is used by the development S&A team to identify authorization objects and field values required to perform the transactions, etc., which are included on the first page of the form. The development S&A team then forwards the completed form to the programming team to make the requested changes. There is also a section to place comments regarding the release.

Additionally, the Profile Data Bank 22 provides data, as well as provides a secondary storage of the data found in the Profile Matrix Tool 24, Profile Requirement Worksheet Tool 26, and S&A Profile change Request Database 28. The S&A team communicates with the Profile Matrix Tool 24, the Profile Requirement Worksheet Tool 26 and the S&A Profile Change Request Database 28 with a S&A Team Interface 25, which may include conventional interface tools such as computer keyboards, a mouse, voice recognition software, other communications tools, or other types of interface tools.

As mentioned, the present invention provides for a S&A Profile Change Request Database 28 which can be used when there is a need to make changes to an existing custom application profile, or if there is a requirement to create a new profile. Personnel can be assigned as approvers for the process owner, development S&A, auditors, among other coding teams, as well as the proxy approval personnel can be designated/maintained by the S&A development team. The database allows requesters of the data the ability to view documented progress on their requests.

Moreover, as previously mentioned, this is different than conventional relational databases or conventional workflow systems because the present S&A Profile Change Request Database 28 specifically determines whether breaches in security have occurred in all phases of the development of a software program. Also, the present database ensures that only those individuals or entities which have been identified by company-specific internal controls, who should have access to the software, will have access to the software.

There are several benefits of the present invention. First, prior to the present invention, no system provided a method and system for tracking updates to changes in profiles of specifications required for software coding and development. Moreover, no other systems or methods provided a history of the updates and changes in such a clear and concise manner as does the present invention. Furthermore, the present invention significantly reduces cycle times and administrative costs in the auditing procedures synonymous with software development. Additionally, the present invention provides for a fully documented database which aids in the internal auditing and control process. Finally, the present invention provides the ability to ensure that software development for a particular program or release is secure in terms of providing access to the development information (such as specifications, requirements, customized solutions, coding, programmers' comments, etc.) to only those individuals and entities absolutely required to have such information.

While the invention has been described in terms of preferred embodiments, those skilled in the art will recognize that the invention can be practiced with modification within the spirit and scope of the appended claims.

What is claimed is:

1. A computer implemented method to track custom computer application development profiles in a data processing system, said method comprising:
   creating said profiles with a first database tool;
   gathering requirements of said profiles with a second database tool;
   tracking modifications of said profiles with a third database tool;
   allowing security and authorization users access to said profiles; and
   determining whether breaches in security of said data processing system have occurred in each phase of development of a computer application program.

2. The method of claim 1, wherein in said step of tracking modifications of said profiles with a third database tool, said third database tool comprises a Profile Matrix, wherein said Profile Matrix comprises a data set.

3. The method of claim 2, wherein in said step of tracking modifications of said profiles with a third database tool, said third database tool tracks the capability of tasks required to gather and implement changes to said profiles.

4. The method of claim 1, wherein in said step of gathering requirements of said profiles with a second database tool, said second database tool comprises a profile requirement worksheet, wherein said profile requirement worksheet identifies said data.

5. The method of claim 1, wherein in said step of gathering requirements of said profiles with a second database tool, said second database tool further identifies authorization objects and field values of said profile requirement worksheet necessary to gather said requirements of said profiles.

6. The method of claim 1, wherein said step of creating said profiles with a first database tool further comprises editing said profiles.

7. The method of claim 6, wherein in said step of creating said profiles with a first database tool, said first database tool comprises a security and authorization profile change request database, wherein said security and authorization profile change request database provides said authorization users and requestors an ability to view documented progress of queries of said profiles.

8. A computer system executing a method to track custom computer application development profiles in a data processing system, said system comprising:
   a first database tool;
   a second database tool connected to said first database tool;
   a third database tool connected to said first and second database tool;
   a data bank connected to said first, second and third database tool; and
   a security and authorization interface connected to said data processing system,
   wherein said first database tool comprises a first set of protocols which create said profiles,
   wherein said second database tool comprises a second set of protocols which gather requirements of said profiles,
   wherein said third database tool comprises a third set of protocols which track modifications of said profiles; and
   wherein said third database tool determines whether breaches in security of said data processing system have occurred in each phase of development of a computer application program.

9. The computer system of claim 8, wherein said third database tool comprises a Profile Matrix, and wherein said Profile Matrix comprises a data set.

10. The computer system of claim 9, wherein said third database tool tracks the capability of tasks required to gather and implement changes to said profiles.

11. The computer system of claim 8, wherein said second database tool comprises a profile requirement worksheet, and wherein said profile requirement worksheet identifies said data.

12. The computer system of claim 8, wherein said second database tool further identifies authorization objects and field values of said profile requirement worksheet necessary to gather said requirements of said profiles.

13. The computer system of claim 8, wherein said first database tool edits said profiles.

14. The computer system of claim 13, wherein said first database tool comprises a security and authorization profile change request database, and wherein said security and authorization profile change request database provides said authorization users and requestors an ability to view documented progress of queries of said profiles.

15. A program storage device readable by machine, tangibly embodying a program of instructions executable by the machine to perform a method to track custom computer application development profiles in a data processing system, said method comprising:

creating said profiles with a first database tool;

gathering requirements of said profiles with a second database tool;

tracking modifications of said profiles with a third database tool;

allowing security and authorization users access to said profiles; and determining whether breaches in security of said data processing system have occurred in each phase of development of a computer application program.

16. The program storage device of claim 15, wherein said third database tool comprises a Profile Matrix, and wherein said Profile Matrix comprises a data set.

17. The program storage device of claim 16, wherein in said method, said step of tracking modifications of said profiles with a third database tool allows tracking capability of tasks required to gather and implement changes to said profiles.

18. The program storage device of claim 15, wherein said second database tool comprises a profile requirement worksheet, and wherein said profile requirement worksheet identifies said data.

19. The program storage device of claim 15, wherein said second database tool further identifies authorization objects and field values of said profile requirement worksheet necessary to gather said requirements of said profiles.

20. The program storage device of claim 15, wherein in said method, said step of creating said profiles with a first database tool further comprises editing said profiles.

21. The program storage device of claim 20, wherein said first database tool comprises a security and authorization profile change request database, and wherein said security and authorization profile change request database provides said authorization users and requestors an ability to view documented progress of queries of said profiles.

* * * * *